E. T. GENNERT.
Process for Extracting Saccharine Matter from Vegetable Substances.
No. 214,559.  Patented April 22, 1879.
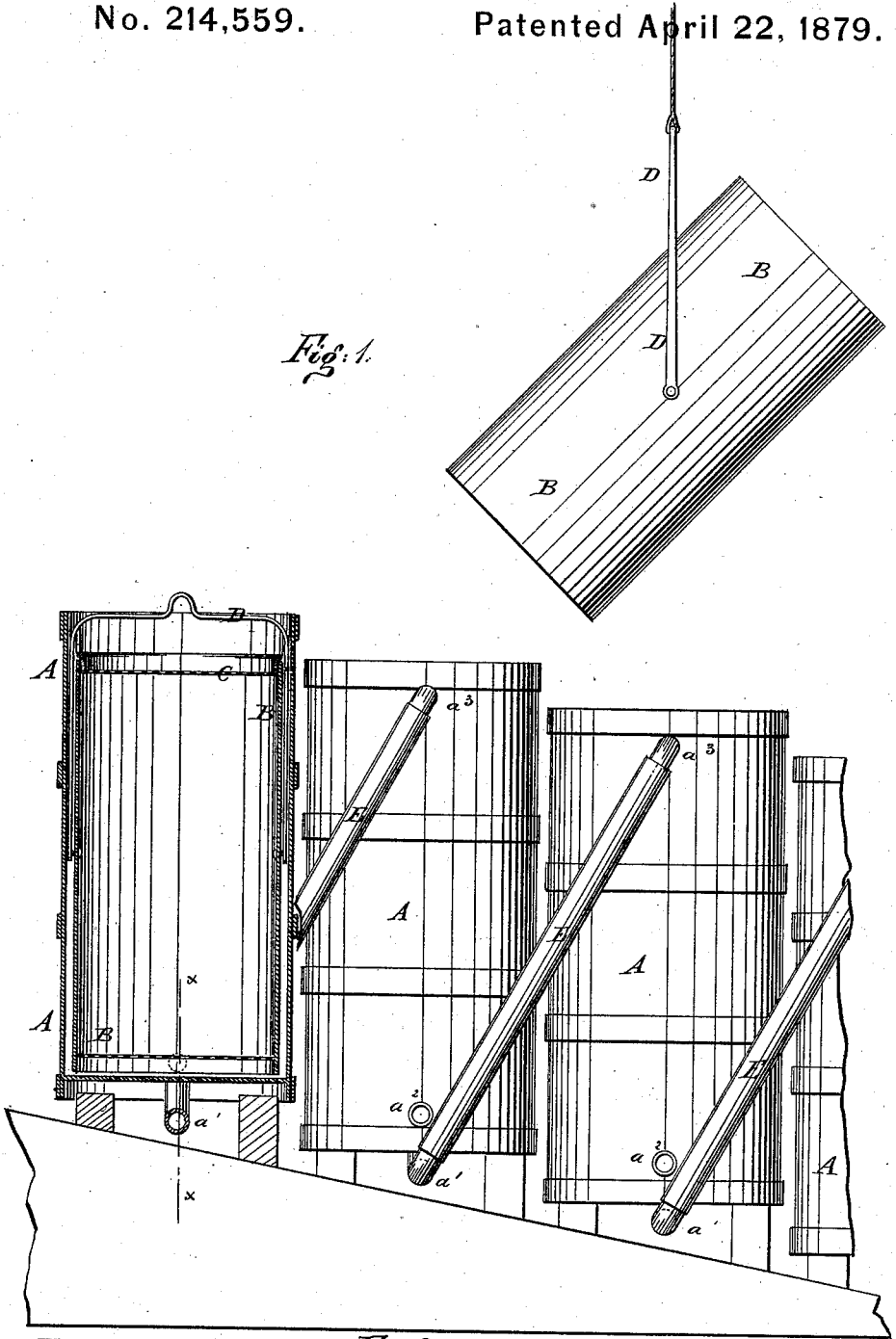

UNITED STATES PATENT OFFICE.

ERNEST T. GENNERT, OF NEW YORK, N. Y.

IMPROVEMENT IN PROCESSES FOR EXTRACTING SACCHARINE MATTER FROM VEGETABLE SUBSTANCES.

Specification forming part of Letters Patent No. 214,559, dated April 22, 1879; application filed March 27, 1878; patented in Canada, May 13, 1878.

*To all whom it may concern:*

Be it known that I, ERNEST THEODOR GENNERT, of New York city, in the county and State of New York, have invented a new and useful Improvement in Extracting Sugar from Vegetable Substances, of which the following is a specification.

Figure 1 is a side view of a portion of my improved apparatus, partly in section to show the construction. Fig. 2 is a detail section taken through the line $x\,x$, Fig. 1.

Similar letters of reference indicate corresponding parts.

The object of the invention is to prevent the packing of the beet or other vegetable substance in the extracting-vat, whereby the proper percolation of the water and stirring of the mass are hindered, and also at the same time to prevent the formation of lactic acid during the extraction of the saccharine matter.

The invention consists in moistening dried beets or other vegetable substances with a solution of superphosphate of lime just before the water is introduced into the extracting-vat.

Heretofore dried beets have been mixed with caustic lime, the latter to combine with the sugar, to destroy the elasticity of the fiber and prevent the beets from swelling to their original size in the water by which the saccharine matter is extracted. This prevents the packing of the beets, so that the water will percolate therethrough and the stirring be performed without difficulty. Now, while caustic lime has these advantages, its use is attended with certain disadvantages, causing the salts of potash to become caustic and rendering soluble matters that cannot be readily separated from the sugary liquid. Hence the sugar crystalizes imperfectly, leaving a large proportion of molasses, and does not check the tendency to the formation of lactic acid or fermentation during the process of extracting the juice by diffusion.

My method of saturating the dried beets with superphosphate of lime in solution before water is admitted to the extracting-vat obviates these objections, while it has also the usual advantages of the caustic lime. By removing the covers from my extracting-vats the contents can be readily stirred, a whole charge removed, and another entered without interrupting the regular work.

A is an outer vat, made of wood or metal, and of any desired size, having an outlet-pipe, $a^1$, in its bottom, and outlets $a^2$ in the lower part of its sides. Within the vat A is placed a vat, B, which is made with a perforated bottom, and is provided with a sunken perforated cover, C. To the sides of the vat B are pivoted, at a little distance above its center, the ends of a bail, D, to receive a rope or chain, by which the said inner vat is raised and lowered. The manner in which the bail D is pivoted to the sides of the vat B enables the said vat to be easily emptied when desired.

A series of vats, A B C, are arranged, each succeeding vat being placed at a little lower level than the preceding one, and the outlet $a^1$ of each preceding vat is connected with an inlet, $a^3$, in the succeeding vat near its top by a pipe, E, so that the upper vat, when nearly full, will discharge its liquid from its lower end into the upper part of the succeeding vat, the liquor passing through the pipe E.

In using the apparatus, I take dried beets and moisten them with a solution of superphosphate of lime, by sprinkling or other convenient means, until they are thoroughly saturated with said solution. As thus prepared the beets are placed in the inner vats, B, the covers C are put in, and a stream of water is introduced into the cover C of the highest vat, which water percolates through the material in the inner vat, B, passes out through the outlet $a^1$ and pipe E into the cover C of the next vat, and so on through the series until it has acquired the desired density.

This operation is continued until all the sugar and superphosphate of lime have been extracted from the material. The sugar-liquor thus extracted is then treated with caustic lime to form an insoluble phosphate of lime, which is removed from the juice, and the liquor thus obtained is then concentrated and the sugar separated in the usual way.

Having thus described all that is necessary to a full understanding of the invention, what I claim as new, and desire to protect by Letters Patent, is—

In the process of extracting saccharine matter from beets and other vegetables, the method of preventing the formation of lactic acid, which consists in moistening the dried beets or other vegetables with a solution of superphosphate of lime just before the water is introduced to the extracting-vat, as set forth.

ERNEST THEODOR GENNERT.

Witnesses:
JAMES T. GRAHAM,
C. SEDGWICK.